(12) United States Patent
Prusak

(10) Patent No.: US 6,572,306 B2
(45) Date of Patent: Jun. 3, 2003

(54) METHOD OF LAYING DATA CABLES AND THE LIKE IN UNDERGROUND PIPES AND PIPE-CABLE COMBINATIONS

(76) Inventor: Martin Prusak, Fürschwendi 793, CH-9036, Grub/SG (CH)

( * ) Notice: Subject to any disclaimer, the term of this patent is extended or adjusted under 35 U.S.C. 154(b) by 69 days.

(21) Appl. No.: 09/766,445

(22) Filed: Jan. 20, 2001

(65) Prior Publication Data

US 2001/0043839 A1 Nov. 22, 2001

Related U.S. Application Data

(63) Continuation of application No. PCT/CH99/00345, filed on Jul. 26, 1999.

(30) Foreign Application Priority Data

Jul. 30, 1998 (CH) ............................................. 1598/98
Mar. 2, 1999 (CH) ............................................. 0372/99

(51) Int. Cl.[7] ................................................ F16L 7/00
(52) U.S. Cl. ............................... 405/183.5; 405/150.1; 405/184.2; 138/108; 264/36.16; 264/267; 264/314; 156/156
(58) Field of Search ............................. 405/146, 154.1, 405/156, 184.1, 184.2, 183.5, 150.1, 150.2; 138/97, 98, 103, 104, 108; 264/269, 516, 573, 36.16, 36.22, 257, 258, 267, 314; 156/94, 156, 294, 295, 287

(56) References Cited

U.S. PATENT DOCUMENTS 2,151,206 A  *  3/1939  Hawthorn ................... 138/111
4,954,016 A  *  9/1990  Storgard .............. 405/184.2 X
5,172,730 A  * 12/1992  Driver .................... 138/103 X
5,305,798 A     4/1994  Driver ......................... 138/98
5,546,992 A  *  8/1996  Chick et al. .................. 138/98
5,908,049 A  *  6/1999  Williams et al. ............ 138/125
5,913,337 A  *  6/1999  Williams et al. ............ 138/125
6,305,427 B1 * 10/2001  Priest, II ................ 138/104 X
6,311,730 B2 * 11/2001  Penza .......................... 138/98

FOREIGN PATENT DOCUMENTS

| DE | 42 03 718 A1 | 8/1993 | ............ H02G/9/06 |
| DE | 197 01 787 A1 | 7/1998 | ............ G02B/6/50 |
| DE | 298 16 103 U 1 | 1/1999 | ............ H02G/9/06 |
| DE | 197 34 274 A1 | 11/1999 | ............ G02B/6/50 |
| EP | 964106 | * 6/1999 | |
| GB | 2124728 | * 2/1984 | |
| GB | 2154808 | * 9/1985 | |
| JP | 02095114 | * 4/1990 | |
| JP | 02221732 | 3/1992 | ............ G02B/6/00 |
| JP | 04102803 | * 4/1992 | |
| JP | 9207216 | * 8/1997 | |

* cited by examiner

Primary Examiner—Jong-Suk (James) Lee
(74) Attorney, Agent, or Firm—Peter K. Kontler

(57) ABSTRACT

One or more electric and/or data transmitting cables are confined in an elongated strip-shaped body containing a hardenable resin or the like, and the body is placed against a portion of the internal surface of an underground sewage, water or other pipe. An expandible tubular liner is thereupon introduced into the pipe and is expanded to press the body against the pipe. The body is caused to set, by conveying a hot fluid through the liner and/or by electrically heating the cable or cables, and to adhere to the internal surface of the pipe. The liner can remain in the pipe and can be bonded to the strip-shaped body and/or to the remaining portion of the internal surface of the pipe. Alternatively, the liner is caused to collapse and is withdrawn from the pipe once the strip-shaped body is bonded to the internal surface of the pipe.

26 Claims, 4 Drawing Sheets

METHOD OF LAYING DATA CABLES AND THE LIKE IN UNDERGROUND PIPES AND PIPE-CABLE COMBINATIONS

CROSS-REFERENCE TO RELATED CASES

The present application is a con't of commonly owned Swiss patent application Serial No. 372/99 filed Mar. 2, 1999 and of commonly owned PCT application Serial No. PCT/CH99/00345 filed Jul. 26, 1999. The disclosures of the above-referenced patent applications, as well as those of all US and foreign patents and patent applications identified in the specification of the present application, are incorporated herein by reference.

BACKGROUND OF THE INVENTION

The present invention relates to improvements in methods of laying and in combinations of parts for confining data cables, electrical conductors and the like in existing underground pathways including those defined by sewage pipes, water pipes, gas pipes and others.

In many communities, including large cities as well as smaller inhabited developments, the pipes (this term is utilized generically and embraces all or practically all types of underground as well as many aboveground passageways and conduits) are already utilized as a means for accommodating, confining, shielding and supporting information-, current- and/or signal-transmitting cables in the form of glass fibers, metallic wire-like conductors and others. An advantage of such mode of confining and shielding cables (this term will be employed hereinafter to cover all kinds of wire-like, filamentary and other components which must be laid to and/or from houses, apartment buildings, office buildings, factories, shops and other establishments in order to receive and/or to transmit information, energy, fluid, signals and the like) in pipes is that the ground need not be dug up by tools and/or by machines in order to gain access to the confined cables which are laid in underground pipes.

Access to underground pipes is required at rather frequent intervals for any one of a large variety of reasons such as to repair damaged pipes, to lay additional cables, to remove damaged and/or no longer needed cables, to establish branches of cables leading into previously unoccupied pipes, to clean the pipes, to reinforce selected portions of or entire pipes, and many others. One of very frequent reasons for the need to gain access to underground pipes is to clean and/or rehabilitate pipes which are confined in the ground below roads, streets, plazas, buildings, parks, playgrounds or the like and are in use for long periods of time, e.g., for 30 years, 50 years or even longer.

One presently preferred mode of restoring the usefulness of antiquated pipes is to provide the internal surfaces of such pipes with liners of a plastic or other suitable material. Unless a complete renovation of underground piping is unavoidable due to the condition of existing pipes, the utilization of liners can prolong the useful lives of internally pressurized or open underground pipes for many years, e.g., for many decades. Therefore, and since the utilization of robots and similar equipment renders it possible to clean existing pipes, to introduce cables into existing pipes and/or to provide existing pipes with suitable liners, it is not necessary to dig up the land above the buried pipes with thus achieved additional savings in time, cost and inconvenience to persons and/or vehicles on the ground above the buried pipes. Another advantage of the just outlined modes of renovating underground pipes is that, in many or most instances, damaged or antiquated underground pipes are frequently found in those sections of cities, towns and other localities which are impoverished so that, quite frequently, they would be last to be assigned extensive repair work involving underground piping if such repair work is expected to be highly expensive.

Certain known restoration methods, namely the so-called hose and liner methods, involve the laying of liners by pulling a liner into a damaged pipe or by turning the liner inside out in the pipe. The liner can contain various tissues and/or foils and/or other constituents and is saturated with a suitable hardenable or settable resin or the like prior to being pressed against the internal surface of the freshly cleaned or non-cleaned pipe by a pressurized liquid or by a compressed gaseous fluid. Once the resin sets, the liner constitutes a new (inner) pipe within the old pipe. As a rule, the new pipe is fluidtight and it can enhance or reestablish the structural integrity of the thus renovated original pipe.

Branches of existing pipes, too, can be renovated (such as reinforced) without difficulty by resorting to the aforediscussed hose and liner method so that the thus renovated pipes and/or their branches are ready for further use for many years with a negligible or minimal reduction of their inner diameters. The just described renovation or restoring work can be carried out regardless of the overall length and layout of existing underground pipes because certain parts of such underground networks are always accessible by way of existing removable or openable covers or the like. Thus, the provision of adits to and exits from existing pipes need not involve any digging up of streets or the like, even for short periods of time.

Published German patent application Serial No. 197 01 787 A1 of Hecht proposes the utilization of a robot for the installation of clamps within an underground sewage pipe and to employ such clamps to secure protective tubing for the confinement of data cables. A drawback of such proposal is that the thus installed protective tubing is likely to be damaged during periodic cleaning of the sewage pipes. Moreover, the tubes which are suspended in the sewage pipes prevent subsequent resort to numerous types of repair work, e.g., the utilization of cleaning robots which are used to establish passages in clogged pipes by resorting to high-pressure water jets or to mechanical means, such as milling cutters. Moreover, debris and other impurities are likely to be intercepted by the suspended tubes and/or by their clamps which can result in rapid clogging of the sewage pipes.

U.S. Pat. No. 5,305,798 (granted Apr. 26, 1994 to Driver) discloses a so-called two-wall leakage detection system for an underground pipe. A detection device, together with a body of absorbent material, is installed between the internal surface of a sewage pipe and the external surface of an impervious tubular liner. The detection device is contacted by moisture in the event of a leak in the underground pipe and/or in the liner. This is ensured by the provision of the aforementioned body of absorbent material which at least partially surrounds the detection device and must remain absorbent if it is to serve its purpose. On the other hand, confined data cables should be installed in a sewage pipe or the like in such a way that they remain out of contact with the gaseous and/or hydraulic fluids which are being conveyed in and/or which penetrate into the pipe due to a leak and/or other damage to the pipe.

Published Japanese patent application Serial No. 02221732 (filed Aug. 22, 1990 by Moriyuki) proposes to establish connections between first optical fiber cables in a manhole and second optical fiber cables by providing a junction box at the inner side of the pivotable lid for the manhole. The connections between the two sets of cables can be established or interrupted while the junction box is accessible, i.e., while the lid is pivoted to a position in which the box at its inner side is accessible from the outside.

Published German patent application Serial No. 42 03 718 A of ANT Nachrichtentechnik GmbH (published Aug. 8, 1993) proposes to install cables in the uppermost portions of underground sewage, water or other pipes so that the cables are contacted by a liquid only when the pipes are filled.

Published German patent application Serial No. 197 34 274 A1 (filed by Siemens A G and published Feb. 11, 1999) discloses discrete fiberoptical cables or groups of coherent fiberoptical cables which are led into underground pipes and thence into individual dwellings. This publication fails to propose the utilization of a liner which could urge the cable or cables against the internal surface of an underground pipe.

OBJECTS OF THE INVENTION

An object of the present invention is to provide a novel and improved method of ensuring that the cable or cables which is or which are confined in a sewage pipe or the like is or are invariably protected against mechanical or chemical damage during and subsequent to laying.

Another object of the invention is to provide an arrangement for the transmission of data through a communal sewage pipe system with at least one sewage pipe and at least one service duct wherein the cable or cables can be communicatively connected with consumers' data cables in a reliable manner.

A further object of the invention is to provide a method which renders it possible to shield confined cables from undesirable mechanical and/or other influences in sewage pipes or the like in several ways.

An additional object of the invention is to provide a method which can be practiced simultaneously with or independently of repair work upon sewage pipes or the like without necessitating any excavation work.

Still another object of the invention is to provide a method which can be resorted to for reliable and long-lasting confinement of cables in underground pipes irrespective of the purpose of such pipes, i.e., regardless of the nature, pressure and/or other parameters of the fluid or fluids which is or are being conveyed in the pipes.

A further object of the invention is to provide a novel and improved combination of an underground pipe and one or more cables in the pipe.

Another object of the invention is to provide a pipe-cable combination which can be established prior or subsequent to burying of the pipe below the ground level, in the wall of a building or in other hard-to-reach locations.

SUMMARY OF THE INVENTION

One feature of the present invention resides in the provision of a method of confining at least one cable (e.g., an electric conductor or an optical fiber cable) in an elongated underground pipe (such as a sewage pipe or a water pipe) having an internal surface (e.g., a cylindrical internal surface). The improved method comprises the steps of confining the at least one cable in a body of a settable material, inserting the body into the pipe prior to setting of the material of such body, introducing into the pipe a deformable tubular liner, expanding the liner from within to thus urge the body against the internal surface of the pipe, and causing the body to set.

The method can further comprise the step of withdrawing the liner from the pipe upon completed setting of the body.

In accordance with a presently preferred feature of the improved method, the step of causing the body to set further includes bonding the body to the internal surface (particularly to a portion of the internal surface) of the pipe.

The body can constitute an elongated strip, and the inserting step can include causing the strip to extend lengthwise of the pipe.

The expanding step can include causing the liner to urge one side of the strip flush against the internal surface of the pipe.

The method can further comprise the step of surrounding the at least one cable by a protective tube or envelope prior to the confining step. The at least one cable can be introduced into the protective envelope prior or subsequent to introduction of the envelope into the body. For example, the at least one protective tube or envelope can be embedded in the body prior to the confining step, and the confining step can include inserting the at least one cable into the at least one tube.

If the at least one cable is a conductor of electric current, the step of causing the body to set can include electrically heating the at least one cable to thus heat a body which consists of or contains a thermosetting material.

The introducing step can include introducing into the pipe a deformable tubular liner which contains at least one reinforcing insert and/or at least one foil.

The confining step can include employing at least one cable having at least one terminal extending beyond an end portion of the pipe upon setting of the body in the interior of the pipe, and such method can further comprise the step of introducing the at least one terminal into a data box or into a second pipe. Still further, such method can comprise the steps of confining the at least one cable in a protective tube or envelope and connecting the at least one cable with at least one additional cable in the interior of the data box. Still further, such method can include the step of confining a portion of the envelope or tube in a suitable enclosure (e.g., in an annular enclosure) for the data box. Such portion of the envelope can contain a small, reasonable or even large supply of the at least one cable.

The just outlined method can further comprise the step of providing at least one of the pipes (i.e., the elongated underground pipe and/or the second pipe) with a recess or channel and confining a portion of the at least one terminal in the recess. Such method can further include providing the at least one pipe with a protective member (such as a collar) for the at least one terminal of the at least one cable. The collar can be affixed to the at least one pipe.

Still further, the method can comprise the step of confining the aforementioned data box in a manhole having a cover which can be pivoted to open position or lifted off the major part of the manhole to afford access to the data box.

The inserting step can include locating the body at the apex of the at least one pipe.

If the liner is to be withdrawn from the pipe upon completed setting of the body, such liner can be made of rubber or another suitable resilient material.

Another feature of the present invention resides in the provision of a combination of parts which includes an elongated pipe defining a path for the confinement and transport of flowable substances (such as sewage or water) and having an internal surface which surrounds the path, a body which contains a hardened resin or another hardenable material and abuts and adheres to a portion of the internal surface of the pipe, and at least one cable (e.g., a fiber optic cable or a conductor of electric current) which is confined in the body.

The improved combination can further comprise a tubular liner having an external surface which abuts in part the internal surface of the pipe and in part the internal surface of the body. Such liner can contain a hardened material and can be permanently embedded in the pipe.

The aforementioned body can include an elongated band or strip which extends lengthwise of the pipe and has an external surface adhering to the internal surface of the pipe.

The at least one cable can constitute a cable made of copper or another metallic material.

The novel features which are considered as characteristic of the invention are set forth in particular in the appended claims. The improved combination of parts itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
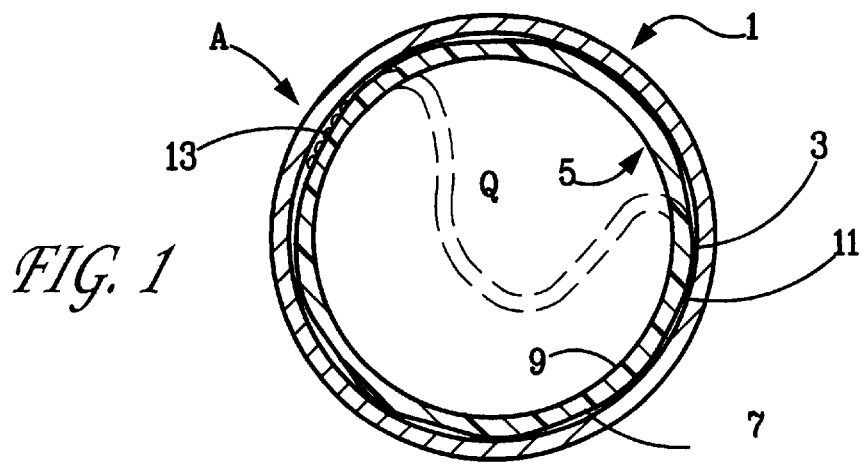
FIG. 1 is a transverse sectional view of a pipe, of a composite tubular liner which is in sealing engagement with the internal surface of the pipe, and of narrow strip- or band-shaped cables embedded in the material of the liner.

FIG. 1 shows a pipe 1 which consists of or contains concrete, steel, a synthetic plastic material, earthenware, glass or the like. Such pipe can be utilized to confine and convey water (such as rain water), liquid or partly liquid sewage or the like. The illustrated pipe 1 has a circular cross-sectional outline; however, it is equally possible to practice the method of the present invention by employing pipes having oval, square, rectangular or other polygonal cross-sectional outlines.

Initially (i.e., when new), the pipe 1 has a smooth internal surface 3. However, due to frictional engagement with conveyed floating sewage, corrosion, other types of wear, shaking, bending (such as that due to sinking of the ground beneath portions of or the entire pipe), etc., the pipe 1 can undergo more or less serious damage including the development of cracks, breaks, leaks and/or shifts at the junctions between the end portions of neighboring pipes and/or as a result of floating away of fragments of pipe, i.e., the integrity of the pipe 1 can be seriously affected even though its internal cross-sectional area Q remains at least substantially unchanged.

In order to compensate for such types of damage to the pipe 1, it is customary to subject the internal surface 3 to a thorough cleaning treatment (such as with a suitable tool or with jets of water) and to thereupon introduce into the pipe a tubular liner 5 (e.g., a hose of at least initially flexible material). In order to simplify or facilitate the introduction of the liner 5 into the pipe 1, it is customary to provide the liner with a fold (as indicated in FIG. 1 by broken lines) and/or to employ a liner having an outer diameter at least slightly less than the diameter of the internal surface 3 of the pipe 1. It is also possible and customary to introduce the liner 5 into the pipe 1 by turning the liner inside out.

Once the liner 5 is confined in the pipe 1, its stability is increased as a result of expansion from within (e.g., as a result of introduction of pressurized water or another hydraulic fluid or by introducing compressed air or another compressed gaseous fluid). The result is that the external surface of the liner 5 lies flush against the internal surface 3 of the pipe 1, i.e., the liner constitutes a pipe within the pipe 1 and reliably seals any cracks or the like in the part 1 of the thus obtained combination of tubular constituents 1 and 5.

The liner 5 can be reinforced by an external coat 7 of glass fibers, felt, natural or artificial filaments and/or the like. Furthermore, the internal surface of the liner 5 can surround a hose-like protective foil 11 of felt or the like and/or a tubular innermost protective layer or foil 9 of any suitable material. The coat 7 and/or the foil 9 and/or 11 is permeated with a hardenable or settable material such as polyester, vinyl ester, an epoxy resin, a 3P resin or the like.

The foil 11 surrounds cables 13 which can consist of glass fibers and are outwardly adjacent the part 7. The illustrated cables are or can be parallel to each other and extend longitudinally of the pipe 1, i.e., in substantial or exact parallelism with the axis of the pipe. Each of the cables 13 is or can constitute a narrow flat band or strip, i.e., such cables contribute little (if anything) to the overall thickness of the parts 5, 7, 9 and 11 within the internal surface 3 so that they do not entail any appreciable or noticeable reduction of the cross-sectional area Q, i.e., of that path which remains available for the conveying of rain water, liquid sewage or the like. The cables 13 may but need not be confined in discrete envelopes or tubes (see the envelope 15 shown in FIG. 2) of plastic and/or other suitable coating and/or shielding material. Furthermore, and even if the cables 13 contribute to a slight reduction of the unoccupied part of the cross-sectional area Q, such reduction is relatively small (as seen circumferentially of the internal surface 3) and extends lengthwise of the pipe 1, i.e., in the direction of flow of water, liquid sewage or the like.

Once the hardening or setting of material which permeates certain strata of or the entire composite liner 5, 7, 9, 11 is completed, the cables 13 are protected from all sides and are non-movably embedded in such composite liner. In addition, the thus confined and shielded cables 13 cannot be damaged by mechanical equipment and/or by the substance or substances (such as water) which is or are utilized to thereafter clean the internal surface of the composite liner 5, 7, 9, 11 (such cleaning can take place at regular intervals or when necessary).

It is clear that the composite liner within the pipe 1 can shield and confine one or more metallic cables (e.g., wire-like conductors consisting of or containing copper) in addition to or in lieu of flat strip-shaped cables 13 of glass fibers or the like.

In order to facilitate the confinement of the cables 13 in the pipe 1, it is presently preferred to temporarily connect the cables to the reinforcing insert 7 and to thereupon impart to this insert an inner and/or outer diameter which is required for convenient introduction into and appropriate confinement in the pipe 1. The end portions or terminals of the cables 13 (see the terminals 13a shown in FIG. 8) preferably extend beyond the respective ends of the insert 7 and pipe 1, e.g., to an extent which is needed for convenient and reliable connection (such as splicing) with the end portions of cables (see the additional cables 43 shown in FIG. 8) in other pipes or in a suitable receptacle (such as the data boxes 31 shown in FIGS. 6 to 9).

Figure 2:
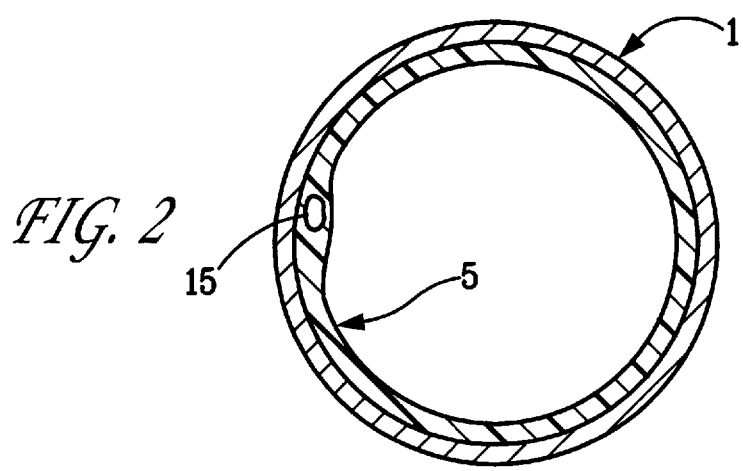
FIG. 2 is a similar sectional view of a pipe, of a liner and of a rod-shaped protective envelope or tube which is embedded in the liner and contains or is ready to receive one or more cables.

In the embodiment of FIG. 2, the pipe 1 confines one or more cables (e.g., wire-like or strip-shaped cables, not shown) which, in turn, is or are confined in a protective tube 15 here shown as a tubular envelope confined in the liner 5 and extending longitudinally of the pipe 1. The embedding of the envelope 15 in the liner 5 of FIG. 2 can be carried out in a manner similar to or identical with that described in connection with FIG. 1. Thus, the liner 5 is in sealing contact with the internal surface of the pipe 1 and contains one or more layers of a material permeated by a hardened or set resin or the like to provide a reliable mechanical support for the envelope 15 as well as to shield such envelope from contact with the material flowing within the liner when the pipe 1 of FIG. 1 is properly embedded in the ground and is in actual use as a part of an underground sewage system, water conveying system, gas conveying system or the like.

The embedding of the envelope 15 into the liner 5, and the resulting slight localized thickening of the respective portion of the liner, does not affect (or does not appreciably affect) the flow of water, liquid sewage or the like within the properly installed and reinforced liner. Moreover, the internal surface of the properly inserted and reinforced liner 5 shown in FIG. 2 is or can be kept smooth so that it offers negligible resistance to the flow of fluids or other flowable materials therewithin. The maintaining of the smoothness of internal surface of the liner 5 is desirable and advantageous because this reduces the likelihood of adherence of solid particles of debris, waste or the like, i.e., the liner 5 offers little or negligible resistance to the conveying of liquid or other flowable materials therethrough.

Cable or cables (such as one or more strips 13 and/or one or more metallic wires) can be introduced into the envelope 15 before or after the latter is embedded in the liner 5 and before or after the liner is embedded and stabilized in the pipe 1 of FIG. 2. The introduction of one or more cables into the envelope 15 can take place by resorting to a pushing or to a pulling technique. Furthermore, one or more damaged cables can be replaced with one or more fresh cables while the pipe 1 of FIG. 2 remains embedded in the ground, i.e., without necessitating even partial excavation or exposure of the pipe. In other words, all such repair work can be carried out (e.g., by resorting to available robots or the like) from within the pipe 1 while the latter remains embedded in the ground.

Figure 3:
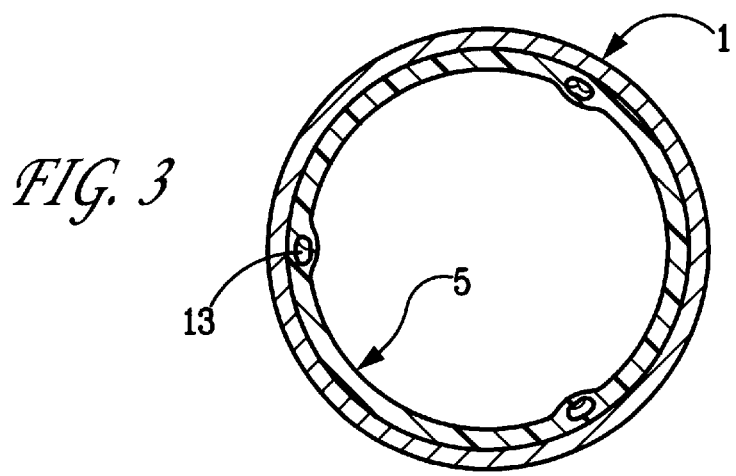
FIG. 3 is a similar sectional view of a pipe, a liner in the pipe and several cables which are embedded in the material of the liner.

FIG. 3 shows a pipe 1 which confines a liner 5 having three equidistant cables 13 embedded therein. It is clear that the number of cables can be reduced or increased as necessary and that the cables need not be equidistant from each other. For example, each of the three cables 13 shown in FIG. 3 can extend between a common source of energy, data or the like and three discrete receivers.

Figure 4:
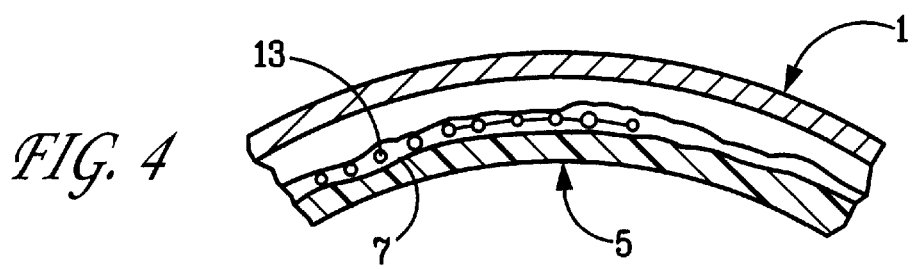
FIG. 4 is an enlarged view of a detail indicated in FIG. 1 by an arrow A.

FIG. 4 illustrates a portion of the pipe 1 of FIG. 1. The pipe confines the liner 5 which serves to confine and shield a set of data transmitting cables 13 (such as glass fibers). More specifically, the cables 13 are embedded in the reinforcing foil or mat 7 which forms part of the composite liner shown in FIGS. 1 and 4 and which, too, can consist of or contain glass fibers.

Figure 5:
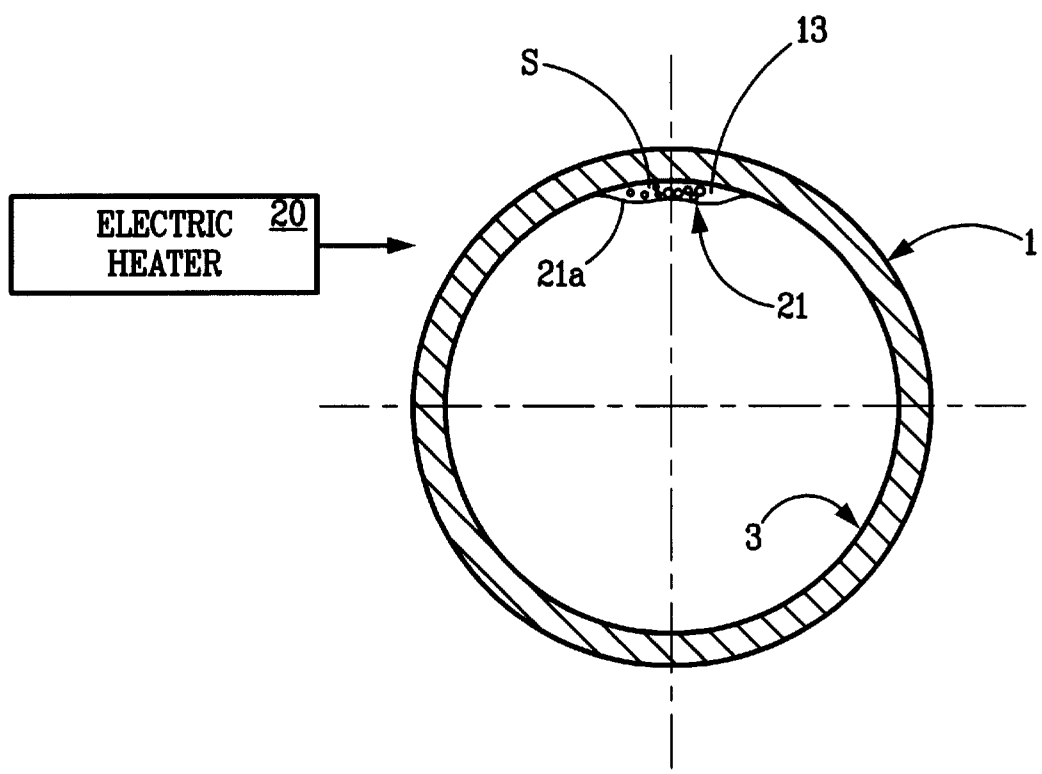
FIG. 5 is a transverse sectional view of a pipe, such as a sewage pipe, and of an elongated strip- or band-shaped body containing several cables and being bonded to the topmost part of the internal surface of the pipe.

Referring to FIG. 5, the information transmitting cables 13 are installed at the internal surface 3 adjacent to or in the topmost portion S of the space within the pipe 1. The cables 13 are installed in a body of hardenable material here shown as a protective band or strip 21 which can protect the cables from considerable (i.e., pronounced) mechanical, chemical and/or other influences. The body or strip or band 21 can be caused to adhere to the internal surface 3 of a new or a restored pipe 1 and/or to the external surface of the liner 5 before the latter is inserted into the pipe. The liner 5 and/or the band 21 can contain a hardenable material, e.g., a suitable thermosetting resin.

Each of the cables 13 can be confined in an envelope 15 of the type shown in FIG. 2, and each such envelope can be embedded in the band 21 of FIG. 5. The presently preferred mode of embedding one or more cables 13 (with or without envelopes 15), e.g., flat strip-shaped cables 13, into the band 21 is as follows: The band 21 can be made of a textile material or it can constitute a fiber glass mat or paper mat, and such material can be permeated with a hardenable resin or the like prior or subsequent to introduction of the cables 13 into the band. A robot (not shown) of commercially available design, or any other suitable inserting device, is employed to thereupon introduce the band 21 into the pipe 1, e.g., between the internal surface 3 of the pipe and an inflatable reusable tubular liner 5. The liner can be made of rubber or another suitable elastomeric material. The hardenable material which permeates the band 21 is caused to set, e.g., as a result of heating by flowable material which is employed to expand the liner and/or as a result of pressure being applied by the liner, and this causes the band 21 to adhere to the internal surface 3 at the apex S of the pipe 1. The next step involves evacuation or lowering of the pressure of the contents (such as compressed air or pressurized water) of the resilient liner 5 and removal of the deflated liner from the interior of the pipe 1.

It is preferred to utilize a body or band 21 having tapering marginal portions (as actually shown in FIG. 5) so that its internal surface 21a merges gradually into the adjacent portions of the internal surface 3 at opposite sides of the apex S. Such design of the band 21 reduces the likelihood of gathering of flotsam along its marginal portions.

The band 21 can contain cables 13 in the form of glass fibers and/or in the form of metallic or other conductors of electric current (e.g., carbon filaments and/or conductors made of copper or another metallic material). Such conductors can be heated by electric current (see the electric heater 20a schematically shown in FIG. 5) subsequent to introduction of the band 21 into the pipe 1 and preferably subsequent to radial expansion of a liner 5 within the pipe to urge the band 21 against the internal surface 3. The heated conductor or conductors 13 then heat the band 21 and cause a setting or hardening of the thermosetting material which permeates the band and/or the envelope(s) 15 within the band. Such mode of causing a thermosetting material of or within the band 21 to set contributes to simplicity and lower cost of the improved method and of the improved combination of a pipe 1 with a liner 5 and/or a band 21.

The aforementioned removable resilient liner can be replaced with a liner (such as the composite liner including the parts 5, 7, 9, 11 shown in FIGS. 1 and 4) which is permeated by a hardenable resin or the like and which is expanded and its hardenable ingredient(s) caused to set so that it remains in permanent sealing engagement with the internal surface 21a of the band 21 and with the adjacent major portion of the internal surface 3. The thus installed liner then constitutes the inner pipe of a twin or composite pipe further including the pipe 1 and confining the hardened band 21 in sealing engagement with the internal surface 3 of the pipe and preferably also with the adjacent portion of the external surface of the hardened liner. The just discussed permanently installed liner can be employed if the pipe 1 of FIG. 5 exhibits one or more leaks, fissures or the like, i.e., if the pipe requires at least some repair work simultaneously with the need for the laying of one or more cables 13 within such pipe. Of course such permanently installed hardened liner is equally useful as a means for reinforcing a new pipe 1 and/or as a means for reliably shielding the cables 13 and the band 21 against contact with the material which is being conveyed within the liner and/or against contact with material which happens to penetrate through one or more cracks, breaks and/or other imperfections of the pipe 1.

FIGS. 6 to 9 illustrate certain details of a system of underground pipes as well as of additional pipes which branch off the underground pipes and extend into buildings located at least in part above the ground level G. The pipes which are shown in FIGS. 6 to 9 are assumed to constitute sewage pipes. At least some of these pipes serve to confine and guide cables, e.g., cables confined in tubular or solid envelopes 15 of the type shown in FIG. 2 (see FIGS. 8 and 9).

Underground sewage systems must be provided with inlets 22 in the form of manholes, scuttles or the like (hereinafter called manholes). The opening 42 at the top of each such manhole is normally closed by a customary cover or lid 45 (see FIG. 7) which, as a rule, must be pivoted to open position or must be removed in its entirety in order to afford access to the respective upright, horizontal and/or otherwise inclined main pipes 23, 23'. The manholes 22 can be disposed at identical or different distances from each other, depending upon the density and/or upon the layout of the underground piping.

Figure 6:
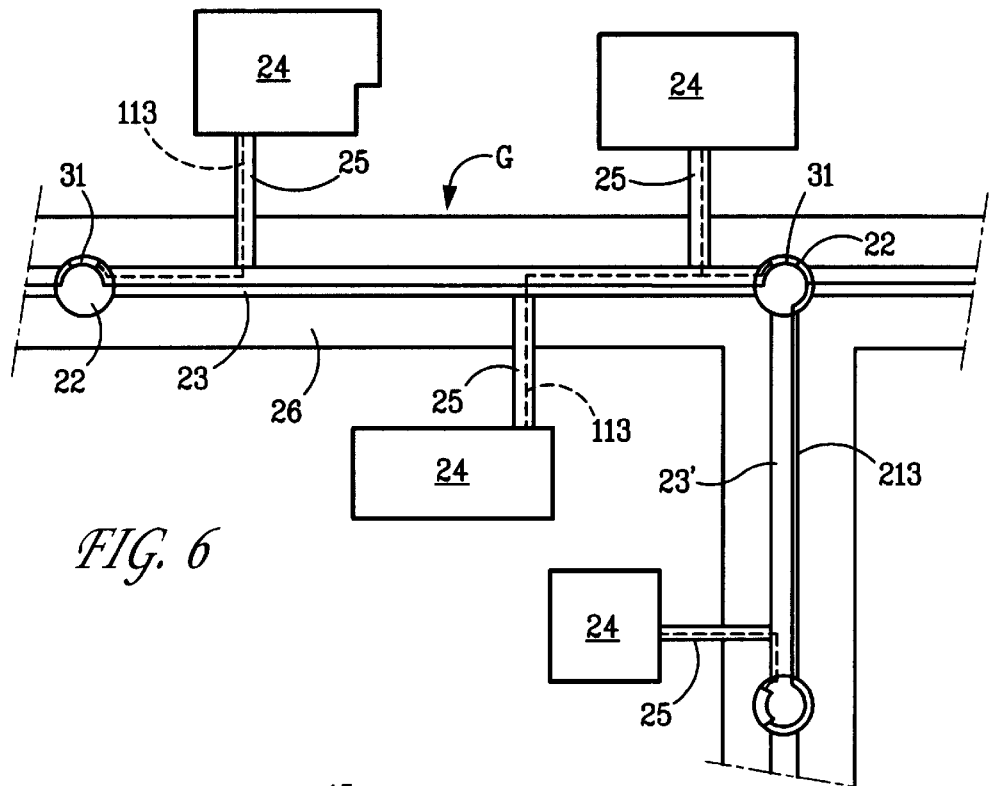
FIG 6 is a schematic view of a system of main pipes and branch pipes which are embedded in the ground and contain cables extending in part between several dwellings and several data boxes which are installed in discrete manholes of the system.

FIG. 6 shows a (horizontal) first main pipe 23 which is embedded in or below the material (such as concrete) of a street 26, and another horizontal main pipe 23' which branches off the main pipe 23 at one of the manholes 22. Smaller (i.e., smaller-diameter) pipes 25 (hereinafter called branch pipes) communicate with the main pipes 23, 23' and lead into and/or from individual dwellings or buildings (or groups of such structures) 24. As a rule, or in many instances, the junctions between the pipes 23, 23' and/or between the pipes 23, 23' on the one hand and the branch pipes 25 on the other hand can be reached only by digging up the street or streets 26 or by resorting to remotely controlled robots or analogous contraptions. Such robots can be utilized to lay cables 13 and/or envelopes 15 (with one or more cables 13 or wire-like cables therein) in the main pipes 23, 23', in the branch pipes 25 and/or through the junctions between such pipes. The laying of the cables 13 and/or envelopes 15 can be carried out in a manner as already described hereinbefore, namely so that the inserted cables and/or envelopes do not appreciably interfere with the flow of water into the dwellings 24 and/or with the flow of sewage from the dwellings into the main pipes 23, 23' and therethrough to a sewage processing plant, not shown.

In addition, the envelopes 15 and/or the cables 13 are laid in the pipes 23, 23' and/or 25 in such a way that the buckling or kinking of the glass fibers or the like at the junctions is prevented in a simple and reliable manner. In the absence of any undertakings to the contrary, buckling is particularly likely to take place where the main pipes 23, 23' meet at angles of 90° or thereabout, where the branch pipes 25 extend at right angles to the respective main pipes, and/or where the cables 13 extend through a manhole 22 and thereafter at right angles into the main pipe 23 and/or 23'. In accordance with a feature of the invention, buckling of the cables 13 is prevented by providing the junctions between the pipes 23, 23', 25 with suitable grooves or channels or recesses 27. Such recesses 27 render it possible to provide the cables 13 and/or the envelopes 15 with suitably rounded (rather than with pronounced or sharp) transitions, i.e., with bends having relatively large radii of curvature) between mutually inclined straight sections.

In FIG. 6, the cables (113) leading from the dwellings 24 into the main pipes 23 or 23' (via the respective branch pipes 25) or vice versa are indicated by heavy broken lines, and the cables (213) leading from pipe to pipe are denoted by heavy solid lines.

Those portions (terminals) 13a, 15a of the cables 13 and/or envelopes 15 which extend into and/or from the end portions of at least some of the pipes 23, 23', 25 can be protected by circular and/or otherwise configurated collars 29 of resin-impregnated filamentary material. Such collars can overlie the annular end faces of the respective pipes and can also extend into the respective end portions of the pipes to even further reduce the likelihood of mechanical, chemical and/or other damage to the cables at the ends of the pipes. Moreover, such or analogous collars can be provided at the junctions of the pipes 23, 23' with the respective branch pipes 25 as well as at the locations where the cables extend from the branch pipes 25 into the respective dwellings 24.

Figure 7:
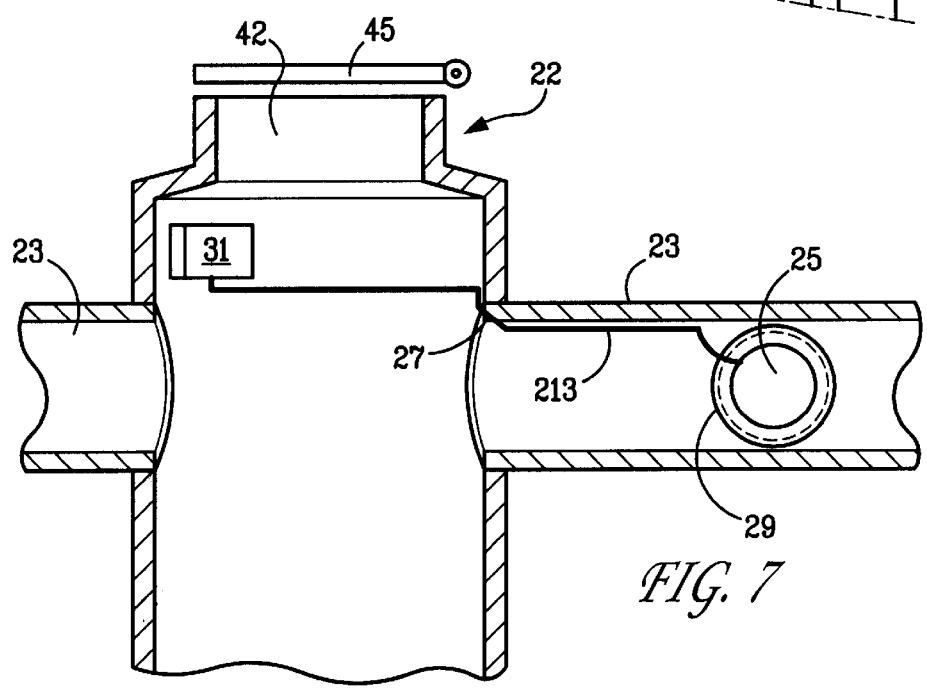
FIG. 7 is an enlarged vertical sectional view of a manhole, of two main pipes or two sections of a single main pipe connected to a wall of the manhole, and of a data box in the manhole.

The aforementioned channels or grooves or recesses 27 need not be provided in the very ends of the pipes 23, 23' and/or 25 (i.e., not exactly in a manner as shown in FIG. 7) but are preferably offset relative to such ends in order to ensure that the cables 13 and/or the envelopes 15 extending into such channels cannot be damaged or are less likely to be damaged by the presently popular implements which are employed to clean the pipes or the internal surfaces of permanently installed liners within the pipes; such implements are often designed to slide over the end portions of the main pipes on their way into the branch pipes and/or vice versa.

It is also possible to replace the separately produced and subsequently installed collars 29 with SPACKLE (Trademark) paste or with another hardenable paste which is injected into selected portions of the pipes to shield the cables 13 and/or the envelopes 15 from cleaning implements, especially at the junctions between the pipes 23, 23', 25. Such hardenable paste can fill the channels 27 to conceal and protect the inserted portions of the cables 13 and/or envelopes 15.

Figure 8:
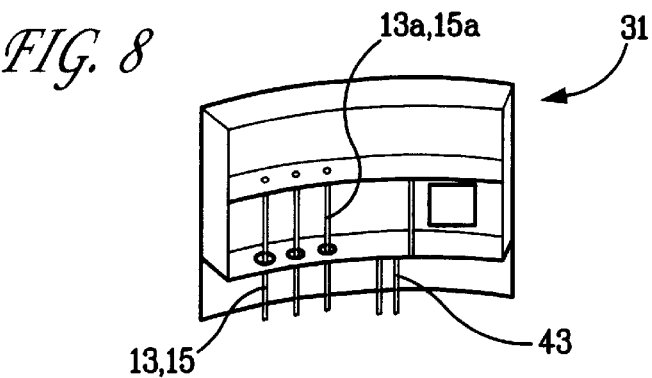
FIG. 8 is a schematic perspective view of a data box, with the door removed or omitted.
Figure 9:
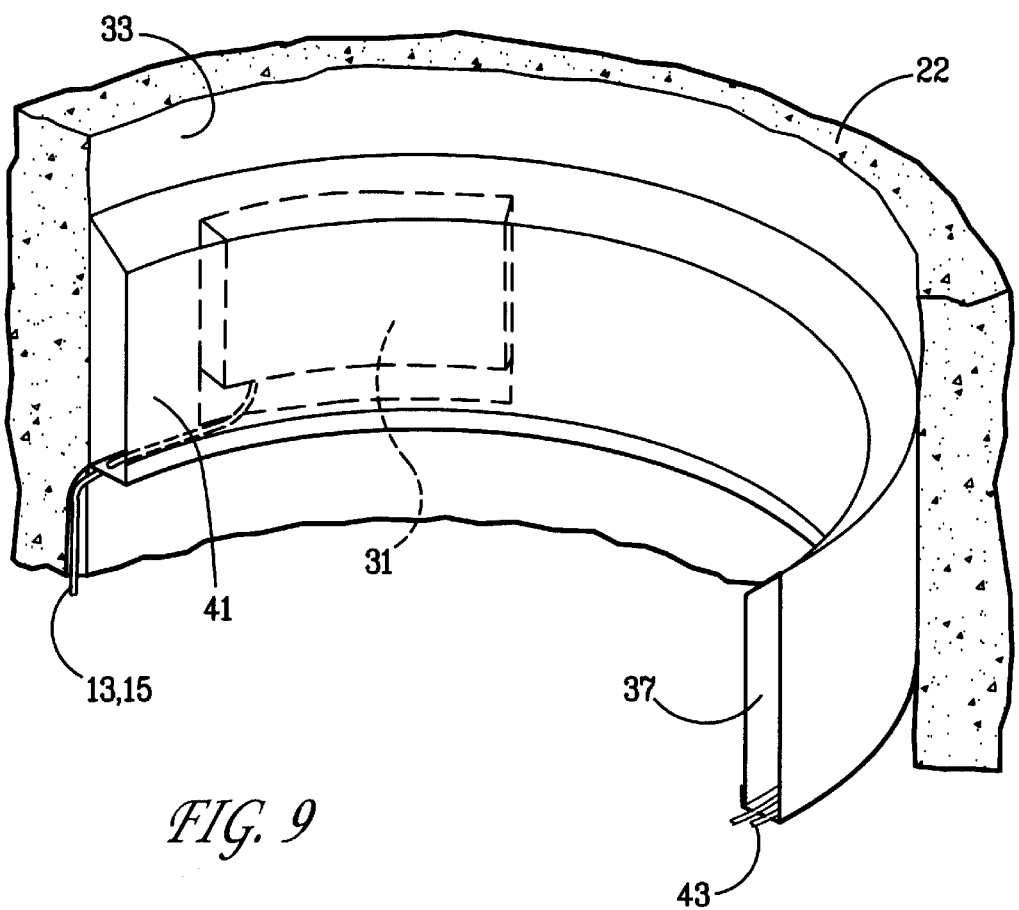
FIG. 9 is a greatly enlarged fragmentary perspective view of a manhole with a data box and an arcuate combined enclosure for the data box and storage facility for spare cable(s) and/or envelope(s).

FIGS. 7 to 9 illustrate receptacles 31 (hereinafter called data boxes) which are installed in the manholes 22. The end portions of terminals 13a, 15a of the cables 13 and/or envelopes 15 extend into the data boxes 31. Each such data box can further contain the terminals of additional cables, envelopes, conductors and/or other components 43 which serve to connect the cables 13 and/or the envelopes 15 with signal transmitting and/or signal receiving instruments (not shown). Furthermore, the aforementioned components 13a, 15a can connect the cables 13 and envelopes 15 with one or more sources of electrical energy if the cables 13 consist of copper or other current-conducting material. The cables 13 can receive or transmit signals or current by way of suitable amplifiers and/or other signal and/or current influencing instruments.

Each data box 31 is or can be separably connected with the wall 33 (see FIG. 9) of the duct constituting or defining the respective manhole 22. The interior of each data box is fluidtightly sealed from the surrounding atmosphere and the terminals 13a, 15a of the cables 13 and/or envelopes 15 extend through the bottom wall or through the rear wall or a sidewall of the data box. The splices or other types of connections between the terminals 13a, 15a of the cables 13 and/or envelopes 15 on the one hand, and the additional cables, connectors or like parts 43 extending into the respective data box from the outside on the other hand, are not specifically shown in FIG. 8. Each data box 31 can be dimensioned in such a way that it can accommodate one or more signal amplifiers, current amplifiers and/or other instruments.

Each data box 31 can be made of an explosion-resistant material, such as a plastic substance, and each such data box can be provided with a strong cover or door 41 which can resist entry by vandals and other unauthorized persons. As shown in FIG. 9, the manhole 22 can confine an arcuate or circumferentially complete housing or enclosure 37 which is secured to the concave internal surface of the wall 33 and serves to guide the cables 13 and/or envelopes 15 between the main pipe(s) 23 and/or 23' and the data box 31; the latter is also confined in the enclosure 37. This enclosure can be an extruded product made of a suitable plastic material, or it can constitute a metallic housing. The arrangement can be such that the enclosure 37 comprises an arcuate or cylindrical rear panel which is reliably affixed to the wall 33 of the manhole 22 and is open at its inner side (facing the observer of FIG. 9). It is also possible to select the dimensions of the door 41 in such a way that it can serve as a closure for the data box 31 as well as for the entire enclosure 37.

If the enclosure 37 is a circumferentially complete annular body, it can be dimensioned in such a way that it can accommodate the data box 31 (or at least one data box) as well as a reasonable (e.g., substantial) supply of spare cable 13 and/or spare envelope 15. For example, and as can be seen in FIG. 6 or 7, the inner diameter of a mahole 22 can be three times the inner diameter of a main pipe 23 or 23' (or even more) so that an annular enclosure 37 in such manhole can store a single convolution or a very large supply or very large supplies of preferably convoluted cables 13 and/or envelopes 15 practically immediately at the locus or loci of eventual use of spare cable or spare envelope.

The enclosure 37 can be removably installed in its manhole 22 in such a way that it can be lifted out of the manhole and placed into the cargo cabinet of a motor vehicle so that all necessary repair work, inspection work or additional or new installation work can be carried out by one or more persons in a protected area rather than while the enclosure 37 is confined in a manhole. The vehicle can be parked at a level above the then exposed top 42 of the manhole 22 so that the cables 13 and/or the envelopes 15 extending from a main pipe 23 or 23' into the enclosure 37 within the vehicle are shielded from rain, snow and other undesirable influences.

The person or persons in the vehicle can perform the required tests, signal measurements, at least certain types of maintenance and/or repair work and/or other tasks by resorting (when nececessary) to instruments, implements and/or other facilities which are available to a person in the interior of the vehicle. All such tasks can be carried out without it being necessary to interrupt the signal transmitting, current transmitting and/or other connections between the dwellings 24 and the data box 31 and/or between the dwellings 24 and the cables 13 and/or envelopes 15 in the main pipes 23, 23'.

It will be appreciated that, if the pipe(s) 23 and/or 23' are to serve merely as a means for shielding cables 13 and/or envelopes 15 between the end portions of such pipe or pipes, the data boxes 31 and the enclosures 37 can be omitted or can remain disconnected from the parts 13 and/or 15. Such simplified arrangement can be resorted to if a main pipe 23 or 23' is not joined with any branch pipes 25, i.e., if a main pipe merely serves to confine one or more cables 13 and/or envelopes 15 which extend straight from one to the other end portion of the respective main pipe. One can then resort to an arrangement of the type shown, for example, in FIG. 5 wherein the strip or band 21 is bonded to the internal surface 3 of the pipe 1 and may but need not be adjacent the external surface of a liner 5 containing a hardened plastic material.

The improved method can be practiced with equal or similar advantage by resorting to pipes which are not sewage pipes or water conveying pipes but serve to convey flows of pressurized water, combustible and/or other gases or the like. It is evident that such utilization of the pipe 1 or its equivalents (such as 23, 23', 25) will necessitate certain modifications, e.g., the mounting of the data box(es) 31 outside of (e.g., at the street level or in a dwelling above) the manhole or manholes 22.

One of the presently preferred undertakings to ensure satisfactory hardening or setting of a substance which is utilized to impregnate the liner 5, the layer 9, the insert 7, the part 11 and/or the envelope 15 is to employ a two-component resin which sets in response to cooling upon completed mixing of its ingredients. Alternatively, one can resort to a thermosetting resin (e.g., a multiple-component resin). The cooling or heating step can be carried out by the fluid (e.g., water) which is conveyed within the liner 5 exclusively for the purpose of causing the resin to set, or which also serves to expand the liner from within and to thus press the strip or band 21 against the internal surface 3 of the pipe 1.

An important advantage of the improved method and of the improved combination of parts is that they render it possible to lay data cables in underground pipelines in such a way that the properly installed cables are reliably protected from mechanical, chemical and/or other damage during and subsequent to laying. Another important advantage of the improved method as well as of the improved combination of parts (such as a pipe, a liner and a cable-containing strip or band which is confined between the pipe and the liner and adheres to the pipe and/or to the liner) is that they render it possible to reliably connect one or more main data cables (such as those in the main pipes 23, 23') with one or more consumers' data cables (such as those in the branch pipes 25) without it being necessary to even partially expose the main pipe(s) and/or the branch pipe(s). A further important advantage of the above outlined method and of the above outlined combination of parts is that the invention can be practiced (a) for the sole purpose of installing and properly splicing and/or otherwise connecting to each other data cables and/or other types of cables, or (b) simultaneously with a required or prescribed or regularly recurring pipe— and/or liner-cleaning work, or (c) simultaneously with necessary repair work upon the piping and/or upon one or more liners.

Although it was already known to lay cables in communal sewage systems, i.e., in pipes which belong to the infrastructure of a community, the improved method ensures the establishment of much more reliable protection for the installed cables because the hardenable structure or structures (such as the strip or band 21 shown in FIG. 5) prevent the cable or cables (13) which is or which are confined therein from moving relative to the pipe (such as 1) regardless of whether the liner (such as 5) is bonded to the pipe and/or to the strip, or is removed as soon as the hardening of thermosetting or other hardenable material in the strip 21 and the bonding of the strip to the internal surface of the pipe is completed. Of course, the novel method establishes an even more reliable confinement, immobilization and mechanical and/or chemical protection for the installed cable or cables if the method comprises the additional step of employing a liner which contains one or more hardenable substances and is permanently installed in the pipe to confine the strip 21 and/or one or more cables 13 and/or envelopes 15 between its external surface and the internal surface (such as 3) of the pipe (such as 1).

The properly laid cable or cables can establish paths for the transmission of information and/or energy between modern communication or energy supplying system(s) and existing (e.g., antiquated) dwellings 24 and/or other types of buildings, as long as such buildings are connected with the main pipe(s) of an underground sewage system (or an analogous underground system) by one or more branch pipes (such as 25).

It has been ascertained that the presence of moisture in a main pipe or in a branch pipe does not affect the useful life and/or other desirable characteristics of fiber optics data cables in underground pipes if the cables are installed and protected in accordance with the method of the present invention.

The aforediscussed supply or supplies of cables 13 and/or envelopes 15 in the enclosure 37 of FIG. 9 (or in an analogous enclosure) renders or render it possible to detach the enclosure from the wall (33) of a manhole 22 and to temporarily confine the enclosure 37 and the data box(es) 31 therein in a vehicle (or under another temporary shelter) without it being necessary to detach the cable or cables extending into the data box(es) 32 from the cable or cables being confined in a pipe 23, 23' and/or 25. This contributes significantly to a reduction of the cost of repair work and/or of the work of laying additional cables in underground pipes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of laying data cables, conductors and the like in underground pipe systems and, therefore, such adaptations should and are intended to be comprehended within the meaning and range of equivalence of the appended claims.

What is claimed is:

1. A method of confining at least one cable in an elongated underground pipe having an internal surface, comprising the steps of:

confining the at least one cable in a body of a hardenable material;

inserting the hardenable material body into the pipe prior to hardening of its material;

introducing into the pipe a deformable tubular liner;

expanding the liner from within to thus urge the hardenable material body against the internal surface of the pipe; and causing the hardenable material body to be hardened.

2. The method of claim 1, further comprising the step of withdrawing the liner from the pipe upon completed hardening of the body.

3. The method of claim 1, wherein said step of causing the body to be hardened further includes bonding the body to the internal surface of the pipe.

4. The method of claim 1, wherein the body is an elongated strip and said inserting step includes causing the strip to extend lengthwise of the pipe.

5. The method of claim 4, wherein said expanding step includes causing the liner to urge one side of the strip flush against the internal surface of the pipe.

6. The method of claim 1, further comprising the step of surrounding the at least one cable by a protective tube prior to said confining step.

7. The method of claim 1, further comprising the step of embedding into the body at least one protective tube prior to said confining step, said confining step including inserting the at least one cable into the at least one tube.

8. The method of claim 1, wherein the at least one cable conducts electric current and said step of causing the body to be hardened includes electrically heating the at least one cable.

9. The method of claim 1, wherein said introducing step includes introducing into the pipe a deformable tubular liner which contains at least one of (a) at least one reinforcing insert and (b) at least one foil.

10. The method of claim 1, wherein said confining step includes employing the at least one cable having at least one terminal extending beyond an end portion of the pipe upon hardening of the body within the pipe, and further comprising the step of introducing the at least one terminal into one of (a) a data box and (b) a second pipe.

11. The method of claim 10, further comprising the steps of confining the at least one cable in a protective envelope and connecting the at least one cable with at least one additional cable in the interior of the data box.

12. The method of claim 11, further comprising the step of confining a portion of the envelope in an enclosure for the data box.

13. The method of claim 12, wherein said portion of the envelope contains a supply of the at least one cable.

14. The method of claim 10, further comprising the step of providing at least one of the pipes with a recess and confining a portion of the at least one terminal in the recess.

15. The method of claim 14, further comprising the step of providing the at least one pipe with a protective collar for the at least one terminal of the at least one cable.

16. The method of claim 15, further comprising the step of affixing the collar to the at least one pipe.

17. The method of claim 10, further comprising the step of confining the data box in a manhole having a cover affording access to the data box.

18. The method of claim 1 of confining at least one cable in a pipe having an apex, wherein said inserting step includes locating the body at the apex of the pipe.

19. The method of claim 1, wherein the pipe is a sewage pipe.

20. The method of claim 1, wherein said introducing step includes employing a resilient liner.

21. A combination comprising:
- an elongated pipe defining a path for the confinement and transport of flowable substances and having an internal surface surrounding said path;
- a body containing a hardenable material being inserted into the pipe and abutting and adhering to a portion of said internal surface, said material being hardened in the pipe subsequent to expansion of a deformable tubular liner which is introduced into the pipe subsequent to insertion of the body; and
- at least one cable confined in said body prior to the insertion of the body into the pipe.

22. The combination of claim 21, wherein said tubular liner has an external surface abutting in part said internal surface and in part said body.

23. The combination of claim 22, wherein said liner contains a hardened material.

24. The combination of claim 21, wherein said body includes a strip extending lengthwise of said pipe and having an external surface adhering to the internal surface of said pipe.

25. The combination of claim 21, wherein said pipe is an underground sewage pipe.

26. The combination of claim 21, wherein said at least one cable is a metallic cable.

* * * * *